United States Patent

[11] 3,564,323

[72] Inventor Haruo Maeda
Tokyo, Japan
[21] Appl. No. 774,413
[22] Filed Nov. 8, 1968
[45] Patented Feb. 16, 1971
[73] Assignee Matsushita Electric Industrial Co., Ltd.
Osaka, Japan
[32] Priority Nov. 14, 1967
[33] Japan
[31] 42/73824

[54] SECONDARY-ELECTRON MULTIPLIER HAVING TILTED ELLIPTICAL PIPES THE ENDS OF WHICH ARE OBLIQUELY CUT
2 Claims, 4 Drawing Figs.

[52] U.S. Cl. ................................................. 313/105;
250/207; 313/103
[51] Int. Cl. ........................................................ H01j 43/00,
H01j 43/22
[50] Field of Search ........................................... 313/103,
104, 105; 250/207, 213

[56] References Cited
UNITED STATES PATENTS
| | | | |
|---|---|---|---|
| 2,821,637 | 1/1958 | Roberts et al. | 313/105X |
| 2,872,721 | 2/1959 | McGee | 313/105X |
| 3,343,025 | 9/1967 | Ignatowski et al. | 313/105 |
| 3,374,380 | 3/1968 | Goodrich | 313/105X |

*Primary Examiner*—Roy Lake
*Assistant Examiner*—David O'Reilly
*Attorney*—Stevens, Davis, Miller & Mosher

ABSTRACT: A secondary-electron multiplier of the channel type having a plurality of channel pipes combined in the form of a bundle. In the multiplier, the channel pipes are arranged to make an angle with respect to the advancing direction of primary electrons and have an oval cross-sectional shape, while the opposite ends of the channel pipes are cut to have a substantially circular section.

INVENTOR
HARUO MAEDA

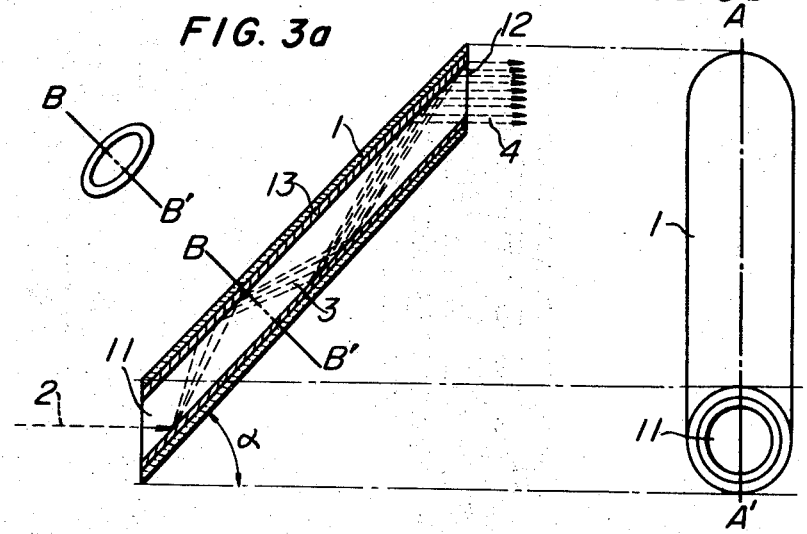
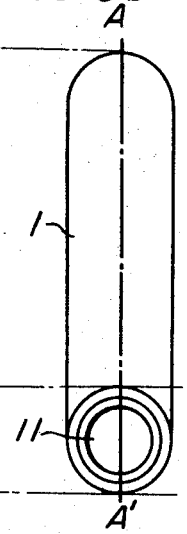
FIG. 3a FIG. 3b
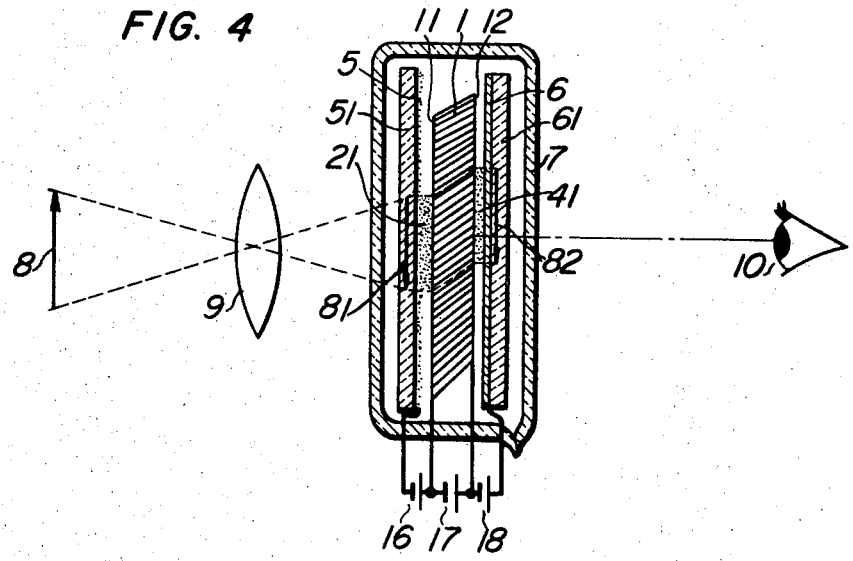
FIG. 4
INVENTOR
HARUO MAEDA
BY Stevens, Davis, Miller & Mosher
ATTORNEYS

SECONDARY-ELECTRON MULTIPLIER HAVING TILTED ELLIPTICAL PIPES THE ENDS OF WHICH ARE OBLIQUELY CUT

This invention relates to a secondary-electron multiplier of the channel type.

A secondary-electron multiplier of the channel type includes a bundle consisting of a plurality of channel pipes which are to effect the multiplication of secondary-electrons. The multiplier is made by cutting the pipe bundle transversely across the axis thereof. The secondary-electron multiplier of the channel type having such a structure has hitherto been used in an image intensifier tube or the like. Multiplication of secondary electrons in the interior of the channel pipe is considered to result from the fact that application of a suitable voltage across the inlet and outlet ends of the channel pipe causes electrons entering the inlet end to impinge against the inner wall of the channel pipe thereby emitting secondary electrons and the secondary electrons thus emitted are accelerated by the accelerating electric field established in the axial direction of the channel pipe so that they impinge against the inner wall of the channel pipe again thereby emitting secondarily produced secondary electrons, such an operation being repeated to multiply the number of electrons. Such a multiplier can be utilized to form the so-called secondary-electron multiplier tube when it comprises a single or several channels whose size is considerably large. However, when a plurality of channel pipes having a diameter less than several tens of microns are bundled to form a planar secondary-electron multiplier, each channel element multiplies each individual beam of primary electrons which is proportional to the relative density of a planar image, and therefore such a secondary-electron multiplier can be utilized as an image intensifier for multiplying the beams of electrons corresponding to individual picture elements.

It is an object of the present invention to provide a novel and improved secondary-electron multiplier which can be used as an image intensifier. Other objects, features and advantages of the present invention will be apparent from the following description of a preferred embodiment thereof taken in conjunction with the accompanying drawings, in which:

FIG. 2a is a schematic perspective view of the secondary-electron multiplier shown in FIG. 1a;

FIGS. 2b and 2c are an end view and a side elevation, respectively, of one of the channel pipes in the multiplier shown in FIG. 2a;

FIGS. 2b and 2e are an end view and a side elevation, respectively, of a channel pipe in the prior art multiplier;

FIG. 3a is a diagrammatic view illustrating the secondary-electron multiplying action in the embodiment of the present invention;

FIG. 3b is a front elevational view of the channel pipe shown in FIG. 3a; and

FIG. 4 is a sectional view of an image intensifier tube employing the secondary-electron multiplier according to the present invention.

Figure 1A:
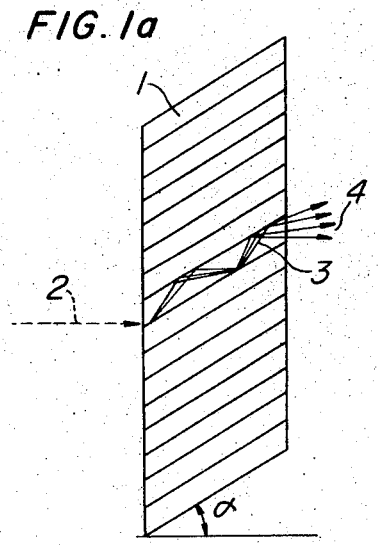
FIG. 1a is a diagrammatic front elevational view of an embodiment of the secondary-electron multiplier according to the present invention.
Figure 1B:
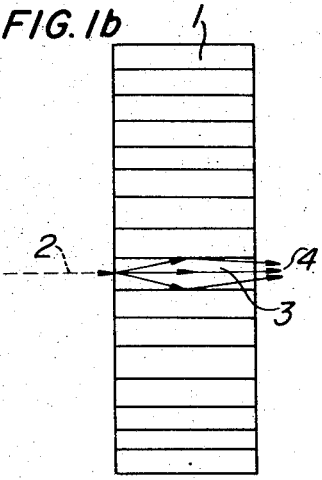
FIG. 1b is a diagrammatic front elevational view of a prior art secondary-electron multiplier.

Referring first to FIG. 1b, a prior art secondary-electron multiplier of the channel type has such a structure that the axis of each channel pipe is perpendicular with respect to the plane along which the bundle of the channel pipes is cut, that is, the plane at which primary electrons enter the secondary-electron multiplier. Thus, the beams of primary electrons which are proportional to the relative density of a planar image enter the secondary-electron multiplier at substantially right angles with respect to the inlet plane. Because of the above arrangement, the prior art secondary-electron multiplier has been defective in that the primary electrons cannot without difficulty impinge against the inner wall surface of the channel pipe at a certain angle of incidence, resulting in unsatisfactory emission of primarily produced secondary electrons.

Referring to FIG. 1a, the secondary-electron multiplier according to the present invention has such a structure that all the channel axes are arranged to make an angle $\alpha$ with respect to the advancing direction of primary electrons so that the incoming primary electrons can easily impinge against the inner wall adjacent to the inlet end of the channel pipes.

In FIGS. 1a and 1b, channel pipes 1 forming the bundle are commonly made from glass containing lead in large amounts. The glass is preferably made from a material having a low specific resistance or is coated thereinside with a thin film of a metal or metal oxide so that the coating has a suitably high resistance and acts as an emission surface of secondary electrons. Primary electrons 2 entering the multiplier impinge against the inner wall of the channel pipe 1 from which a beam of electrons 3 is emitted by the secondary-electron multiplying action and a beam of multiplied secondary electrons 4 emerges from the outlet plane of the multiplier.

Figure 2A:
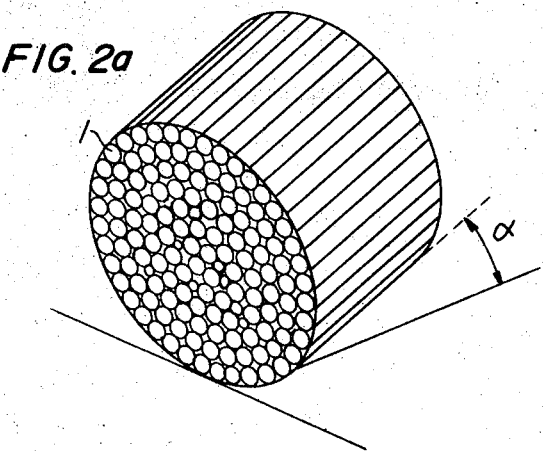
Figure 2B:
Figure 2D:
Figure 2C:
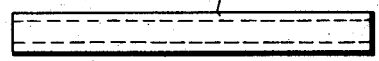
Figure 2E:
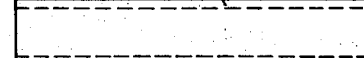

FIG. 2a is a perspective view of the bundle of the channel pipes 1 shown in FIG. 1a and it will be seen that each channel has a substantially circular section at its end. In other words, each individual channel pipe has such a shape that an ellipse extends in its axial direction to form a pipe of oval cross section as shown in FIGS. 2b and 2c. Thus, the channel pipe according to the present invention is distinctly different in shape from the conventional channel pipe which has a circular cross section as shown in FIGS. 2d and 2e. The secondary-electron multiplier of the channel type according to the present invention is thus featured by the provision of a channel pipe having an oval cross section. These channel pipes are stacked in the form of a bundle, which is cut obliquely with respect to the axis of the channel pipe so that the pipe axis makes an angle $\alpha$ of at least 30° with respect to the advancing direction of incoming primary electrons.

In FIGS. 3a and 3b, a single channel pipe in the secondary-electron multiplier according to the present invention is shown in an enlarged scale. FIG. 3a is a section taken on the line A-A' in FIG. 3b and shows how the secondary-electron multiplying action proceeds within the channel pipe. An incoming primary electron 2 entering the channel pipe 1 at the inlet end 11 impinges against the inner wall surface of the channel pipe 1. While repeatedly impinging against the inner wall surface within the internal space of the channel pipe 1, the number of emitted secondary-electrons 3 is multiplied and finally a beam of multiplied secondary electrons 4 emerges from the outlet end 12 of the channel pipe 1. In the embodiment shown in FIGS. 3a and 3b, the channel pipe 1 is made from glass and is coated thereinside with a secondary electron emission surface 13 in the form of a high resistance thin film of a metal or metal oxide. The high resistance thin film may be dispensed with when the channel pipe 1 is made from glass having a suitably low specific resistance and containing therein lead in large amounts as described previously.

In FIG. 3b the inlet end 11 of the channel pipe 1 at which the primary electron enters is seen as having a substantially circular sectional shape. This will be duly understood from the fact that, when a pipe having an oval cross section is cut in a state in which the pipe axis is tilted by an angle $\alpha$ in the direction of the minor axis of the ellipse, the cross section of the pipe approaches a circle from the oval. By virtue of the substantially circular sectional shape of each channel pipe at the inlet end thereof, the resolution of the two-dimensionally distributed beams of incoming electrons corresponding to an image is uniform in every direction. Thus, it will be understood that an image intensifier which is free from undesirable directivity in the resolution can be obtained when the secondary-electron multiplier of the channel type according to the present invention is employed to form such an image intensifier.

In FIG. 4, there is shown one form of an image intensifier employing therein the secondary-electron multiplier of the channel type according to the present invention. The image intensifier comprises a vacuum envelope 7 enclosing therein the secondary-electron multiplier of the channel type 1. A glass plate 51 having a photoconductive surface 5 is disposed on one side of the secondary-electron multiplier 1 in such a relation that the photoconductive surface 5 thereof is opposite to the inlet plane 11 of the secondary-electron multiplier 1. A glass plate 61 having a fluorescent surface 6 is disposed on the other side of the secondary-electron multiplier 1 in such a relation that the fluorescent surface 6 thereof is opposite to the outlet plane 12 of the secondary-electron multiplier 1. The glass plates 51 and 61, however, may be replaced by the opposite inner walls of the vacuum envelope 7. An image 81 of an object 8 is projected through a main lens 9 on the photoconductive surface 5 from which a group of photoelectrons 21 corresponding to the image 8 is emitted. These photoelectrons 21 are attracted by a positive electric field established by an external power supply 16 to enter the individual channels of the secondary-electron multiplier of the channel-type 1 at the inlet plane 11 thereof and are multiplied by the electron multiplying action described above to emerge from the outlet plane 12 as a group of multiplied secondary electrons 41. The inlet plane 11 and the outlet plane 12 of the secondary-electron multiplier 1 have a conductive coating thereon and an external power supply 17 is connected therebetween the apply a voltage so as to establish a positive electric field within the channels. An external power supply 18 is connected between the outlet plane 12 of the secondary-electron multiplier 1 and the fluorescent surface 6 in such a relation that the fluorescent surface 6 is positive with respect to the outlet plane 12. The group of multiplied secondary electrons 41 emerging from the outlet plane 12 is attracted by the positive potential to impinge against the fluorescent surface 6. As a result, an intensified image 82 appears on the fluorescent surface 6 and an observer 10 can observe the intensified image 82.

It will be understood from the foregoing description that the present invention increases the probability with which the incoming primary electrons impinge against the inner surface of the channel pipes and thus the incoming primary electrons can efficiently be multiplied by the secondary-electron multiplying action. Furthermore, by virtue of the fact that the sectional shape of the channel pipes at the inlet end is substantially circular, many of these channel pipes can be stacked in the form of a bundle so that the individual channel pipes can be arranged to intensify the corresponding picture elements of an electron beam image without any directivity in the resolution.

I claim:

1. A channel-type secondary-electron multiplier comprising a plurality of channel pipes each having an inlet end and an outlet end, each said channel pipe having an inside surface of secondary-electron emissive nature, each said channel having an elliptical cross-sectional shape with said inlet and outlet ends cut at an oblique angle with respect to the longitudinal axis of said pipes whereby said ends have a substantially circular section.

2. A multiplier according to claim 1 wherein said pipes are stacked in the form of a bundle mounted with its longitudinal axis at an oblique angle with respect to the advancing direction of the primary electrons whereby said inlet and outlet ends are substantially perpendicular to said direction.